UNITED STATES PATENT OFFICE.

GEORGE COOK, OF PARIS, ILLINOIS.

IMPROVEMENT IN ROTARY HARROWS.

Specification forming part of Letters Patent No. 25,390, dated September 13, 1859.

*To all whom it may concern:*

Be it known that I, GEORGE COOK, of Paris, in the county of Edgar and State of Illinois, have invented a new and Improved Rotary Harrow; and I do hereby declare that the following is a full, clear, and exact description of the same, reference being had to the accompanying drawings, forming a part of this specification, in which—

Figure 1 represents a transverse vertical section of my invention, the line $x$ $x$, Fig. 2, indicating the plane of section. Fig. 2 is an inverted plan of the same.

Similar letters in both views refer to corresponding parts.

This invention consists in arranging the teeth of a rotary harrow on triangular frames, which revolve on oblique pins, in such a manner that they form hollow segments, said teeth to be set on lines which do not pass through the centers of the frames, so that they clean themselves more readily, and so that they cause the frames to revolve without any extra weight.

To enable those skilled in the art to make and use my invention, I will proceed to describe it.

The main frame A of my harrow is constructed of two separate frames, B B, which consist of two beams, $a$ $a$, joined at one end under an acute angle, and united by center pieces, $b$. The two frames B B are secured together by means of cross-beams C, and the whole frame is further strengthened by longitudinal central timbers, D, as clearly shown in Fig. 2. Each of the frames B carries a triangular rotary frame, E, which revolves on a pivot, $c$, placed in an oblique direction through the center pieces, $b$, and through the longitudinal central timbers, D, as clearly represented in Fig. 1. By referring to this figure it will be seen that the lower ends of these pins incline toward each other. The teeth $d$ are fastened in the frames E on lines which do not pass through the center, it being found that said teeth clean themselves more readily than teeth placed on radial lines. This will be easily understood by following the motion of the teeth in both cases. When the teeth are placed radially the ground thrown out by the outside teeth never comes in contact with the next succeeding teeth. When the same are placed eccentrically, on the other hand, the ground dug up by the outer teeth is partially thrown against those nearer to the center, so that by the action of one tooth the next following one is kept clean.

The harrow is drawn along by two hooks, F, secured to the front end of the frames B, and by reason of the oblique position of the pivots $c$ the teeth on the triangular frames E form concave segments, the outside teeth being depressed into the ground, while those on the inside of the pivots are raised, as clearly shown in Fig. 2. By this arrangement the frames E are retarded on one side of the pivots $c$, and when the harrow is drawn along said frames are caused to revolve. By these means the rotation of the revolving frames is effected without any extra weight, and the teeth of the harrow cut into the ground as they rotate from above, so that the ground has less tendency to fly out under the action of the teeth, and it is pulverized easier and more perfectly with my harrow than with other implements for the same purpose.

S. CROWELL, Jr.
Coffee Pot.
No. 25,391.
Patented Sept. 13, 1859.
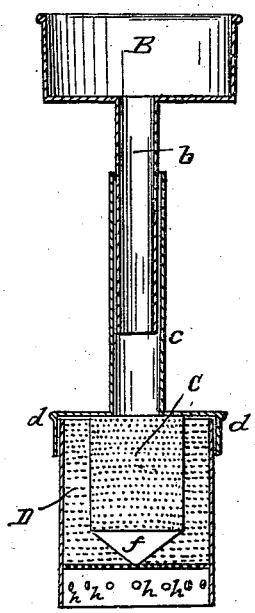
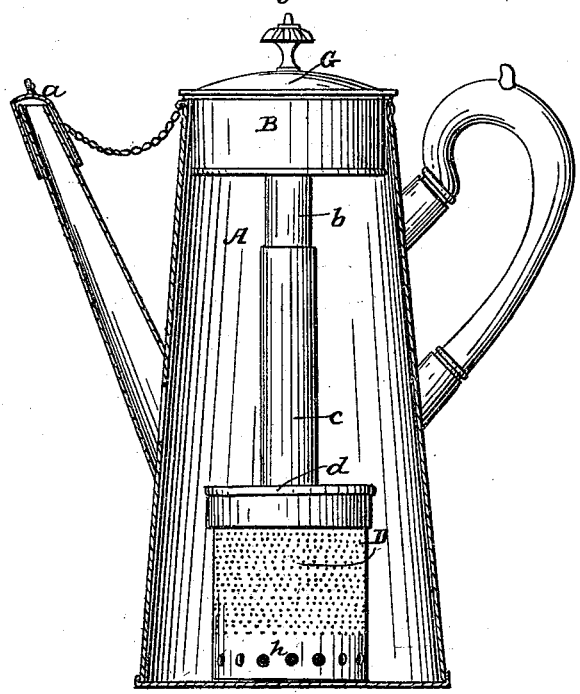

What I claim as new, and desire to secure by Letters Patent, is—

The arrangement of the teeth $d$, placed eccentrically on triangular frames E, which rotate on oblique pivots $c$, substantially as and for the purpose specified.

GEORGE COOK.

Witnesses:
G. W. RIVES,
J. D. MCLEAN.